US010218510B2

(12) United States Patent
Kinney et al.

(10) Patent No.: US 10,218,510 B2
(45) Date of Patent: Feb. 26, 2019

(54) NETWORK-BASED DEVICE AUTHENTICATION SYSTEM

(71) Applicant: Branch Banking and Trust Company, Winston-Salem, NC (US)

(72) Inventors: Patricia Kinney, Cary, NC (US); Sumit Deshpande, Rolesville, NC (US); Matthew Whitley, Cary, NC (US); Gopinath Rajagopal, Cary, NC (US); Michael Anthony Dascola, Raleigh, NC (US); Satya Acharya, Raleigh, NC (US); Angela Taylor, Raleigh, NC (US)

(73) Assignee: Branch Banking and Trust Company, Winston-Salem, NC (US)

( * ) Notice: Subject to any disclaimer, the term of this patent is extended or adjusted under 35 U.S.C. 154(b) by 184 days.

(21) Appl. No.: 15/170,339

(22) Filed: Jun. 1, 2016

(65) Prior Publication Data

US 2016/0352524 A1 Dec. 1, 2016

Related U.S. Application Data

(60) Provisional application No. 62/169,333, filed on Jun. 1, 2015.

(51) Int. Cl.
*H04L 29/06* (2006.01)
*H04L 9/32* (2006.01)

(52) U.S. Cl.
CPC .......... *H04L 9/3247* (2013.01); *H04L 9/3226* (2013.01); *H04L 9/3297* (2013.01); *H04L 63/083* (2013.01); *H04L 63/0876* (2013.01)

(58) Field of Classification Search
CPC ... H04L 9/3247; H04L 9/3297; H04L 9/3226; H04L 63/0876; H04L 63/083
See application file for complete search history.

(56) References Cited

U.S. PATENT DOCUMENTS

| 8,121,945 | B2 * | 2/2012 | Rackley, III | G06Q 20/042 235/380 |
| 8,145,568 | B2 * | 3/2012 | Rackley, III | G06Q 20/042 235/380 |
| 8,160,959 | B2 * | 4/2012 | Rackley, III | G06Q 20/042 235/380 |
| 8,467,766 | B2 * | 6/2013 | Rackley, III | G06Q 20/042 455/406 |

(Continued)

*Primary Examiner* — David Garcia Cervetti
(74) *Attorney, Agent, or Firm* — Kilpatrick Townsend & Stockton LLP

(57) ABSTRACT

An authentication system may receive a request signature corresponding to a user request to view secure user information on a user device and generate a server-side signature matching the request signature to authenticate the user device to receive the secure user information without authenticating the user. The request signature may include a device identifier corresponding to the device, a token code generated by the authentication system and stored by the user device, a timestamp corresponding to the transmission time of the request signature, and a version of the device identifier, the token code, and the timestamp encrypted using a signature key provided to the user device by the authentication system. The authentication system may generate the server-side signature using the timestamp and stored copies of the device identifier, the token code, and the signature key.

20 Claims, 10 Drawing Sheets

(56) References Cited

U.S. PATENT DOCUMENTS

| | | | | |
|---|---|---|---|---|
| 8,489,067 B2* | 7/2013 | Rackley, III | ......... | G06Q 20/102 455/406 |
| 8,510,220 B2* | 8/2013 | Rackley, III | ........... | G06Q 40/00 705/39 |
| 8,528,059 B1* | 9/2013 | Labana | ................... | H04L 63/08 705/76 |
| 9,628,495 B2* | 4/2017 | Grigg | ..................... | G06F 21/31 |
| 9,686,245 B2* | 6/2017 | Brand | ................ | H04L 63/0428 |
| 9,736,147 B1* | 8/2017 | Mead | .............. | H04L 63/083 |
| 9,824,356 B2* | 11/2017 | Kurian | ................ | G06Q 20/401 |
| 9,836,594 B2* | 12/2017 | Zhang | .................... | G06F 21/45 |
| 2003/0182555 A1* | 9/2003 | Labaton | .............. | H04L 63/0442 713/176 |
| 2004/0187024 A1* | 9/2004 | Briscoe | .................. | H04L 63/08 726/29 |
| 2005/0033994 A1* | 2/2005 | Suzuki | ................. | H04L 63/083 726/19 |
| 2006/0117046 A1* | 6/2006 | Robertson | ............... | H04L 67/16 |
| 2007/0005779 A1* | 1/2007 | Yao | .................... | H04L 63/0807 709/228 |
| 2007/0022473 A1* | 1/2007 | Hird | ....................... | H04L 63/08 726/9 |
| 2007/0118273 A1* | 5/2007 | Tang | ..................... | G08G 1/042 701/117 |
| 2008/0184029 A1* | 7/2008 | Sims | .................. | H04L 63/0823 713/156 |
| 2009/0113538 A1* | 4/2009 | Eom | ..................... | G06F 21/335 726/12 |
| 2009/0228966 A1* | 9/2009 | Parfene | .................. | G06F 21/31 726/7 |
| 2009/0300738 A1* | 12/2009 | Dewe | ...................... | G06F 21/33 726/6 |
| 2010/0070761 A1* | 3/2010 | Gustave | ............... | H04L 9/3247 713/156 |
| 2010/0180124 A1* | 7/2010 | Morijiri | .................. | G06F 21/32 713/176 |
| 2010/0260145 A1* | 10/2010 | Voyer | .................. | H04L 63/0823 370/331 |
| 2011/0047373 A1* | 2/2011 | Karasawa | ............... | G06F 21/33 713/156 |
| 2012/0036364 A1* | 2/2012 | Yoneda | ..................... | H04L 9/30 713/175 |
| 2012/0159172 A1* | 6/2012 | Saxena | ................... | G06F 21/57 713/171 |
| 2012/0292388 A1* | 11/2012 | Hernandez | ........... | G06Q 20/108 235/379 |
| 2012/0331298 A1* | 12/2012 | Xu | .......................... | H04L 63/08 713/171 |
| 2013/0023240 A1* | 1/2013 | Weiner | .................. | H04W 12/06 455/411 |
| 2013/0036048 A1* | 2/2013 | Campos | ................. | G06Q 20/36 705/41 |
| 2013/0159195 A1* | 6/2013 | Kirillin | ............... | G06Q 20/322 705/71 |
| 2013/0285855 A1* | 10/2013 | Dupray | ................... | G01S 19/48 342/451 |
| 2013/0294230 A1* | 11/2013 | Popa | ..................... | H04W 36/22 370/230 |
| 2014/0281577 A1* | 9/2014 | Nicholes | ................. | G06F 21/71 713/189 |
| 2014/0282640 A1* | 9/2014 | Nielsen | ............... | H04N 21/442 725/9 |
| 2014/0304505 A1* | 10/2014 | Dawson | .............. | G06F 21/6227 713/165 |
| 2015/0170144 A1* | 6/2015 | Palma Lizana | ....... | H04L 9/0861 705/44 |
| 2015/0235192 A1* | 8/2015 | Kobres | .................. | G06Q 20/18 705/18 |
| 2015/0310194 A1* | 10/2015 | Zhang | ..................... | G06F 21/31 726/9 |
| 2015/0310427 A1* | 10/2015 | Yi | ........................ | G06Q 20/385 705/64 |
| 2015/0334098 A1* | 11/2015 | Keys | ..................... | H04L 63/08 726/9 |
| 2015/0334099 A1* | 11/2015 | Zhang | ..................... | G06F 21/45 726/6 |
| 2015/0365403 A1* | 12/2015 | Counterman | ....... | H04L 63/0876 726/9 |
| 2016/0080326 A1* | 3/2016 | Brand | ................ | H04L 63/0428 713/155 |
| 2016/0191494 A1* | 6/2016 | Claes | .................. | H04L 63/0853 713/159 |
| 2016/0344729 A1* | 11/2016 | Slaight | ................. | H04L 63/061 |
| 2016/0379431 A1* | 12/2016 | Borg | .................. | G07C 9/00706 340/5.28 |

* cited by examiner

NETWORK-BASED DEVICE AUTHENTICATION SYSTEM

CROSS-REFERENCE TO RELATED APPLICATION

This claims priority to U.S. Provisional Application Ser. No. 62/169,333, filed Jun. 1, 2015 and titled "Web-Based System for Providing Secure Information," the contents of which are incorporated herein by reference.

TECHNICAL FIELD

The present disclosure relates to authentication systems, and more particularly, though not necessarily exclusively, to generating matching signature requests to authenticate user devices to access secure information without user authentication.

BACKGROUND

Certain information is sensitive in nature, requiring authentication processes to secure the information and ensure that the information is accessible only to authorized users of the web-based platforms. The authorization process may require time and effort to complete and may extend the time it takes to access the sensitive information. This may be particularly true when multiple steps are required in the authorization process and data transmission between a user device and an authentication system is required for each step. For example, a user may be required to remember a username and password specific to the information or web-based platform for providing the information. The user may also be required to answer security questions or provide additional identifying information to ensure that the user is authorized to access the information.

SUMMARY

In some aspects, a device authentication system may include a processor that is communicatively connectable to a user device via a network. The device authentication system may also include a memory that is accessible to the processor. The memory may include instructions that are executable by the processor to cause the processor to receive a request signature from the user device via the network. The request signature may correspond to a request from a user of the user device to access secure user information. The request signature may include a device identifier corresponding to the user device, a token code that was previously transmitted to the user device by the processor, a timestamp corresponding to a transmission time that the request signature was transmitted from the user device to the processor, and an encrypted signature including a version of the device identifier, the token code, and the timestamp that was encrypted by the user device using a signature key that was previously transmitted to the user device by the processor. The memory may also include instructions to cause the processor to identify a stored device identifier corresponding to the device identifier in a database by comparing the device identifier received from the user device with device identifiers stored in the database to determine a matching device identifier corresponding to the stored device identifier.

In certain aspects, the memory may also include instructions to cause the processor to retrieve the stored device identifier and a stored token code associated with the stored device identifier in the database. The memory may also include instructions to cause the processor to calculate a delay between the transmission time of the request signature and a time that the request signature was received at the authentication system. The memory may also include instructions to cause the processor to determine that the delay is within a threshold window of time. The memory may also include instructions to cause the processor to, in response to determining that the delay is within the threshold window of time, generate a server-side signature. The server-side signature may include the stored device identifier, the stored token code, and the timestamp encrypted using a stored signature key. The memory may also include instructions to cause the processor to compare the server-side signature to the encrypted signature to determine a signature match. The memory may also include instructions to cause the processor to, in response to determining the signature match, authenticate the user device to access the secure user information.

In some aspects, a method may include receiving, at an authentication system, a request signature from a user device via a network. The request signature may correspond to a request from a user of the user device to access secure user information. The request signature may include a device identifier corresponding to the user device, a token code previously transmitted to the user device by the authentication system, a timestamp corresponding to a transmission time that the request signature was transmitted from the user device to the authentication system, and an encrypted signature including a version of the device identifier, the token code, and the timestamp encrypted by the user device using a signature key previously transmitted to the user device by the authentication system. The method may also include identifying a stored device identifier corresponding to the device identifier in a database by comparing the device identifier received from the user device with a device identifiers stored in the database to determine a matching device identifier corresponding to the stored device identifier.

In certain aspects, the method may also include retrieving the stored device identifier and a stored token associated with the stored device identifier in the database. The method may also include calculating a delay between the transmission time of the request signature and a time that the request signature was received at the authentication system. The method may also include determining that the delay is within a threshold window of time. The method may also include, in response to determining that the delay is within the threshold window of time, generating a server-side signature using the stored device identifier, the stored token code, and the timestamp. The method may also include comparing the server-side signature to at least a portion of the request signature to determine a signature match. The method may also include, in response to determining the signature match, authenticating the user device to access the secure user information.

In some aspects, a non-transitory computer-readable medium comprising program code executable by a processor of an authentication system to cause the processor to receive a request signature from a user device via a network. The request signature may correspond to a request from a user of the user device to access secure user information. The request signature may include a device identifier corresponding to the user device, a token code previously transmitted to the user device by the processor, a timestamp corresponding to a transmission time that the request signature was transmitted from the user device to the processor, and an encrypted signature including a version of the device identifier, the token code, and the timestamp encrypted by the user device using a signature key previously transmitted to the user device by the processor. The program code may also cause the processor to identify a stored device identifier corresponding to the device identifier in a database by comparing the device identifier received from the user device with a device identifiers stored in the database to determine a matching device identifier corresponding to the stored device identifier. The program code may also cause the processor to retrieve the stored device identifier and a stored token code associated with the stored device identifier in the database. The program code may also cause the processor to calculate a delay between the transmission time of the request signature and a time that the request signature was received at the authentication system.

In certain aspects, the program code may also cause the processor to determine that the delay is within a threshold window of time. The program code may also cause the processor to, in response to determining that the delay is within the threshold window of time, generate a server-side signature, the server-side signature including the stored device identifier, the stored token code, and the timestamp encrypted using a stored signature key. The program code may also cause the processor to compare the server-side signature to the encrypted signature to determine a signature match. The program code may also cause the processor to, in response to determining the signature match, authenticate the user device to access the secure user information.

DETAILED DESCRIPTION

Figure 1:
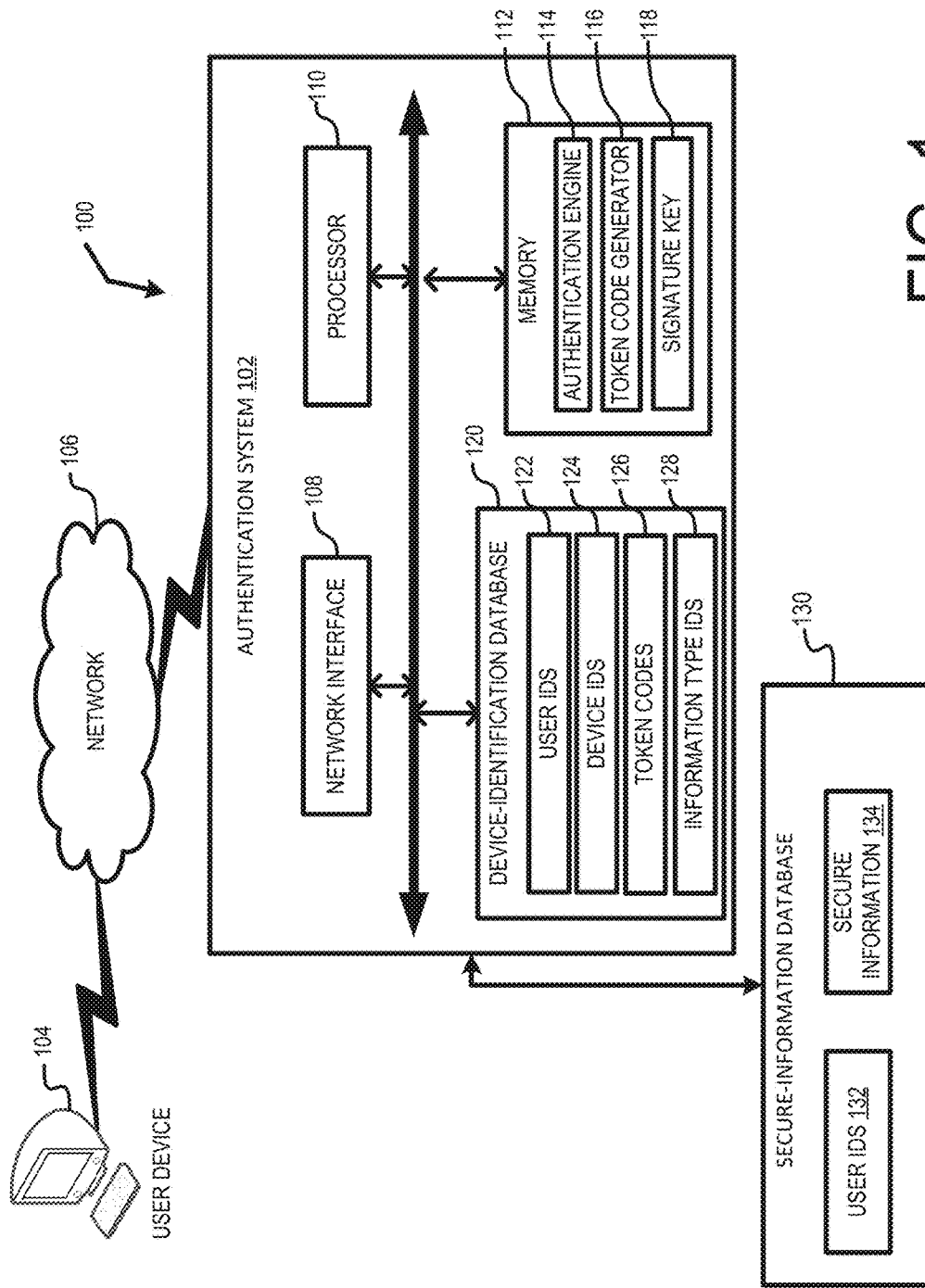
FIG. 1 is a block diagram depicting a network environment including an authentication system according to some aspects of the present disclosure.

Certain aspects and features relate to independently generating a signature matching a user device signature corresponding to a request to access secure information and authenticating the user device to access the secure information without authenticating a user of the device. In one aspect, a system may receive a request for up-to-date and secure information from a user via a user device. The request may be transmitted to the system in the form of a request signature. The request signature may include a token code, a device identifier, and a timestamp. The request signature may also include a version of the token, device identifier, and timestamp encrypted using a signature key stored in the user device. The signature may include a set of characters transmitted to the user device by the system prior to the request. The token code may be randomly generated by the system and stored in the user device. The device identifier may include identifying information unique to the user device. The timestamp may correspond to the time the request is transmitted to the system. The system may retrieve stored copies of the token code and the device identifier from a database to recreate the request signature using the stored copies of the token code and device identifier, the timestamp, and the signature key. The system may compare the request signature to the recreated request signature to determine if the request signature generated by the user device matches the request signature generated by the system. The system may transmit the requested secure information to the user device based on a match between the request signature and the recreated signature.

In another aspect, the system may also register the user device to receive the secure information without authenticating the user. The system may require a one-time authentication of the user to associate a device identifier corresponding to the device with user information stored in a system database. The system may generate a unique token code and transmit the token code and a signature key to the user device. In certain aspects, the system may request an information type corresponding to the type of secure information requested by the device. The system may receive the information type and link the device identifier, token code, and information type to the user information. The system may store the device identifier, token code, and information type in the system database for reference to subsequently authenticate the user device.

Authorization processes may be particularly cumbersome where the secure information to be accessed by a user is information that is regularly changing, requiring frequent requests for accessing up-to-date information. The frequency request for accessing up-to-date information may require frequent transmissions of data between the system and the user device over a network. The frequency of the requests may result in increased processing power required to effectively handle the requests and reduced bandwidth in transmitting information over the network. This problem may be compounded in systems communicative coupled to a large number of disparate users via the network. A system according to some aspects may streamline the authentication process by allowing frequently accessed information to be quickly viewed by the user while limiting the number of network transmissions for each request.

Systems according to some aspects may be particularly beneficial for managing frequently changing information. For example, the secure information may relate to financial information. Easy access to financial information, or a portion of the financial information (e.g., account balances, recent transactions, scheduled payments, transactions requiring approval, transactions requiring review, budget summary information, expense summary information, etc.), via systems that does not require repeated user authentication may allow for quick access to the information without a burdensome authentication process. Once the user device is registered, a user may enable the device to receive the secured information without requiring user authentication.

Current systems may use an auto-authentication process that automatically receives user authentication information from the user device without requiring the user to enter the user authentication information manually. Such systems may allow the user device to store the user authentication information. But, users may risk the user authentication information easily being erased or "forgotten." For example, a second user of the user device may easily erase the user authentication information, incidentally or purposefully, by logging into the systems using different user authentication information. In another example where the user authentication information may be stored as a web cookie in the user device, a user may clear all web cookies on the user device causing the user authentication information to be forgotten.

Use of a device registration process according to some examples of the present disclosure may eliminate the risk of erased or forgotten user authentication information, as the user authentication information may not be required for accessing the secured information. Instead, systems according to some aspects may recognize the user device based on the device registration process, and requests for secure information according to some examples of the present disclosure may be honored when received from a known user device.

Various aspects of the present disclosure may be implemented in various environments. FIG. 1 is a block diagram depicting a network environment 100 including an authentication system 102 according to some aspects of the present disclosure. The authentication system may be communicatively coupled to a user device 104 via a network 106, such as the Internet. The user device 104 may represent one or more user devices communicatively coupled to the authentication system 102 via the network 106. The user device 104 may be a computing device, such as a laptop, mobile phone, desktop computer, personal digital assistant, wearable device tablet, etc., that may display content in a web browser or other user interface. In some aspects, the user device 104 may represent multiple user devices communicatively coupled, directly or indirectly, to the authentication system 102 over the network. For example, the user device 104 may represent a wearable device (e.g., a smart watch) communicatively coupled to a mobile phone. The mobile phone may be communicatively coupled to the authentication system 102. The authentication system 102 may receive requests and commands from and provide user interfaces to the wearable device via the mobile phone. The authentication system 102 may receive requests and commands from the user device 104 via the network 106 and configure the user interfaces to be provided to the user device 104 in response to the requests and commands.

The authentication system 102 includes a network interface 108 coupled to a processor 110 and a memory 112 via a bus. The network interface 108 may include a network card or other device communicatively coupled to the network 106 to allow user devices, such as the user device 104, to access the authentication system 102 for authenticating the user device to receive secure information. In some aspects, the network interface 108 may transmit user interfaces generated by the processor 110 via the network 106 to the user device 104 to facilitate the transmission of the secure information.

The processor 110 may execute instructions stored in the memory 112 to perform the operations of the authentication system 102. The processor 110 may include a single processing device or multiple processing devices. Non-limiting examples of the processor 110 include a field-programmable gate array, an application-specific integrated circuit ("ASIC"), and a microprocessor. The memory 112 includes a storage device that retains information when powered off. Non-limiting examples of the memory 112 include electrically erasable and programmable read-only memory, a flash memory, or any other type of non-volatile memory.

In some examples, at least a portion of the memory 112 may include a computer-readable medium from which the processor 110 can access and execute instructions of the memory 112. A computer-readable medium may include electrical, optical, magnetic, or other storage devices capable of providing the processor 110 with computer-readable instructions or other program code. Non-limiting examples of a computer-readable medium include magnetic disks, memory chips, read-only memory, random-access memory, an ASIC, a configured processor, optical storage, or any other medium from which the processor 110 may read instructions. The instructions may include processor-specific instructions generated by a compiler or an interpreter from code written in any suitable computer-programming language, including, for example, C, C++, C#, COBOL, Java, etc.

The instructions include an application, such as authentication engine 114, including one or more algorithms for registering a user device in the authentication system 102, for authenticating the user device subsequent to registration, and for retrieving secure user information from a memory location in a database and transmitting the information to the user device via the network 106. In some aspects, the authentication engine 114 may also cause the processor 110 to generate one or more user interfaces for receiving commands and requests from the user device 104 and for displaying information stored in memory locations accessible to the authentication system.

The memory 112 also includes a token code generator 116. The token code generator 116 may include instructions for randomly generating token codes. In some aspects, the token codes generated by the token code generator 116 may include a set of alphanumeric characters that may be transmitted to the user device 104. In additional and alternative aspects, the token code may be unique to the user device 104. The memory also includes a signature key 118. In some aspects, the signature key may include a set of characters or code to allow the user device 104 to encrypt a request for secure information.

The authentication system 102 also includes a device-identification database 120. The device-identification database 120 may include a single database or multiple databases including information to facilitate authenticating user devices 104 and identifying secure information to transmit to the user devices 104 via the network 106. The device-identification database 120 includes user identifiers 122, device identifiers 124, token codes 126, and information type identifiers 128. The user identifiers 122 may include information corresponding to an identity of an account holder, member, or other user of a user device 104. In some aspects, the user identifiers 122 may include a unique set of alphanumeric characters, such as an online banking ("OLB") number assigned to accountholders to distinguish holders of each account managed by a financial institution. In other aspects, the user identifiers 122 may include a unique set of alphanumeric characters provided by or issued to each user, including, but not limited to, a social security number. The device identifiers 124 may include a unique set of alphanumeric characters specific to the user device 104 for purposes of identifying the user device 104. In some aspects, the device identifiers 124 may include a vendor identification number, a serial number, etc.

The token codes 126 may include stored copies of the token codes generated by the token code generator 116. The token codes 126 may be stored in the device-identification database 120 in a manner that associates the token code 126 with one or both of the user identifier 122 or the device identifier 124 corresponding to the user device for which the token code 126 was generated. The information type identifiers 128 may correspond to an information type associated with the secure information. For example, the information type identifiers 128 may include a first code or set of characters corresponding to a first type of secure information and a second code or set of character corresponding to a second type of secure information. The information type may be selected by the user during registration of the user device 104 and used to determine the type of secure information that authenticating the user device 104 may allow the user device 104 to access.

A secure-information database 130 may be communicatively coupled to the authentication system 102. Although the secure-information database 130 is shown as a separate component from the authentication system 102, the secure-information database 130 may be included as an integral component of the authentication system 102 without departing from the scope of the present disclosure. The secure-information database 130 includes one or more memory locations that have user identifiers 132 and secure information 134. The user identifiers 132 correspond to the user identifiers 122 and may be used to identify the user associated with the secure information 134. For example, the user identifiers 132 may be stored in the secure-information database 130 in a manner that associates the user identifier with the secure information 134. The secure information 134 may include information sensitive, or otherwise personal, to the user and may be accessible to a user subsequent to an authentication process. The secure information 134 stored in the secure-information database 130 may include various types of information corresponding to the information type identifiers 128 stored in the device-identification database 120. In one example, the secure information 134 may include financial account balance information, including various types such as checking account balances, savings account balances, credit card balances, mortgage balances, car loan balances, etc.

Figure 2:
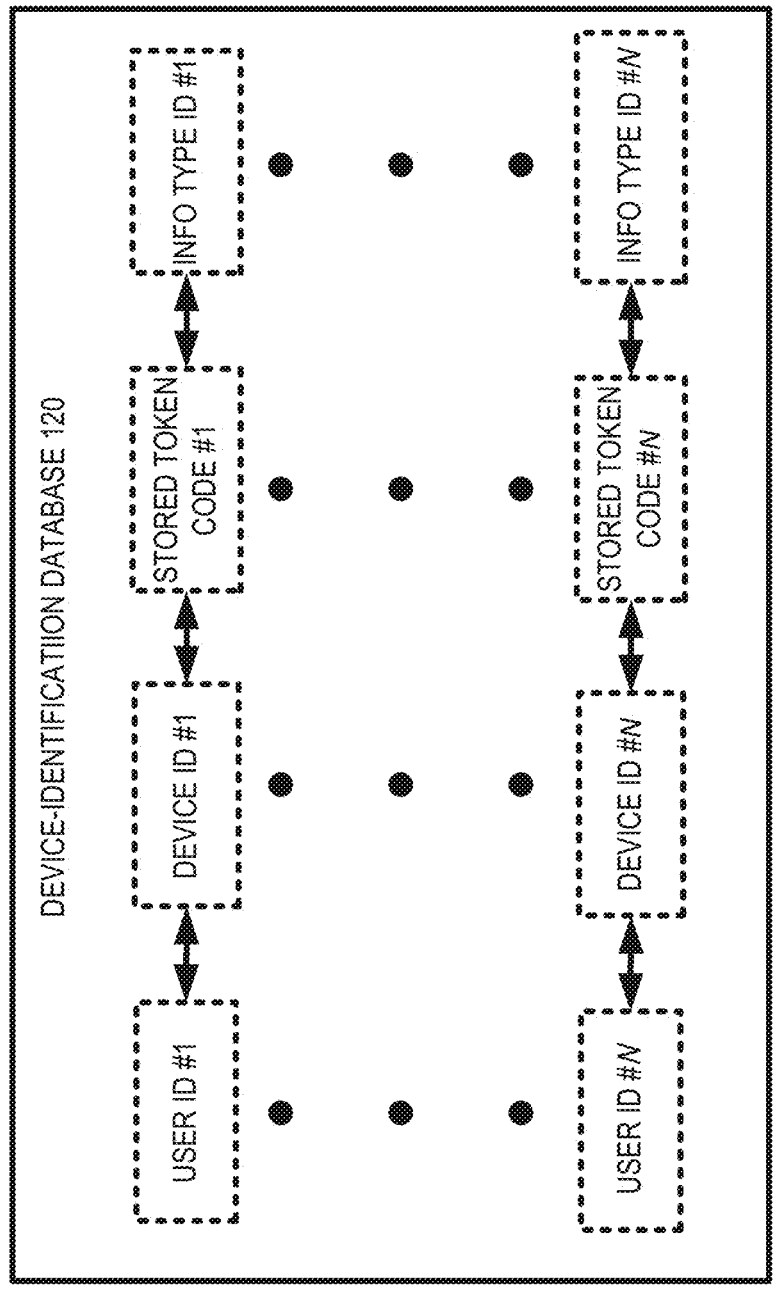
FIG. 2 is a block diagram depicting an example visualization of a memory location in the device-identification database of FIG. 1 according to some aspects of the present disclosure.

FIG. 2 is a block diagram depicting an example visualization of a memory location in the device-identification database 120 according to some aspects of the present disclosure. The user identifiers 122, the device identifiers 124, the token codes 126, and the information type identifiers 128 of the device-identification database 120 in FIG. 1 are depicted in a visual arrangement corresponding to the associations between the information in the database 120. In some aspects, the memory location including the information may correspond to a relational table or matrix having rows and columns. Information in each row may be associated, or otherwise linked. Each row may correspond to a different user or user device 104. For example, the user identifier #1 may correspond to a first user and the device identifier #1 may correspond to a user device 104 of the first user. The stored token code #1 may correspond to a token code 126 generated by the token code generator 116 and stored on the user device 104 of the first user. The information type identifier #1 may correspond to an information type selected by the first user when registering the user device 104 for authentication by the authentication system 102. Although the device-identification database 120 of FIG. 2 depicts a memory location including a table including the stored information, the stored information of the device-identification database 120 may be arranged in any manner that honors the associations of the stored information. For example, the stored information may be stored in separate memory locations and include one or more markers, objects, or other associating means to link the related information.

Figure 3:
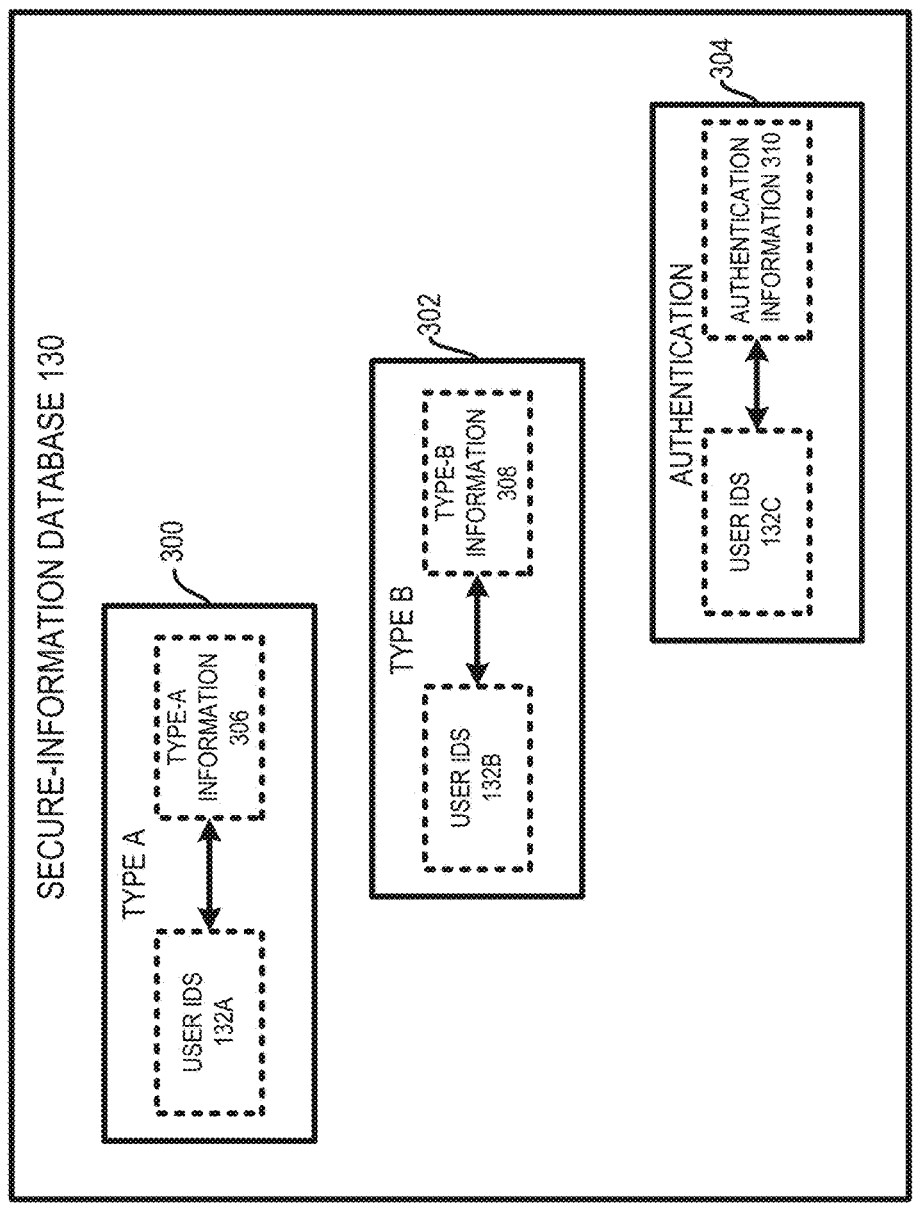
FIG. 3 is a block diagram depicting a visual example of memory locations in the secure-information database of FIG. 1 according to some aspects of the present disclosure.

FIG. 3 is a block diagram depicting a visual example of memory locations in the secure-information database 130 according to some aspects of the present disclosure. The secure-information database includes copies of the user identifiers 132 of FIG. 1 stored in separate memory locations 300, 302, 304. The memory locations 300, 302, depicted in FIG. 3 correspond to a different type of the secure information 134 of FIG. 1. For example, the secure information 134 may include type-A information 306 and type-B information 308. The type-A information 306 is stored in the memory location 300 corresponding to secure information of a type A. The type-B information 308 is stored in the memory location 302 corresponding to secure information of a type B. In one example, the type-A information may correspond to checking account balances and the type-B information may correspond to credit card balances. Each type of information may be associated with a copy of the user identifier 132A, 132B corresponding to the user or holder of the checking account and credit card in the respective memory location 300, 302.

In some aspects, at least a portion of the secure information 134 of FIG. 1 may include authentication information 310. In some aspects, the authentication information 310 may include a username, email address, a password, or other identifying information that may be stored in the secure-information database 130. In additional aspects, the authentication information may also include other information, such as user-inputted answers to security questions.

Although three memory locations 300, 302, 304 are shown, the secure-information database 130 may include any number of memory locations, including one, without departing from the scope of the present disclosure. Similarly, although FIG. 3 depicts the secure information in separate memory locations based on the type of information, the secure information may be stored in any manner that associates the user identifiers with the secure information.

Registering a User Device

Figure 4:
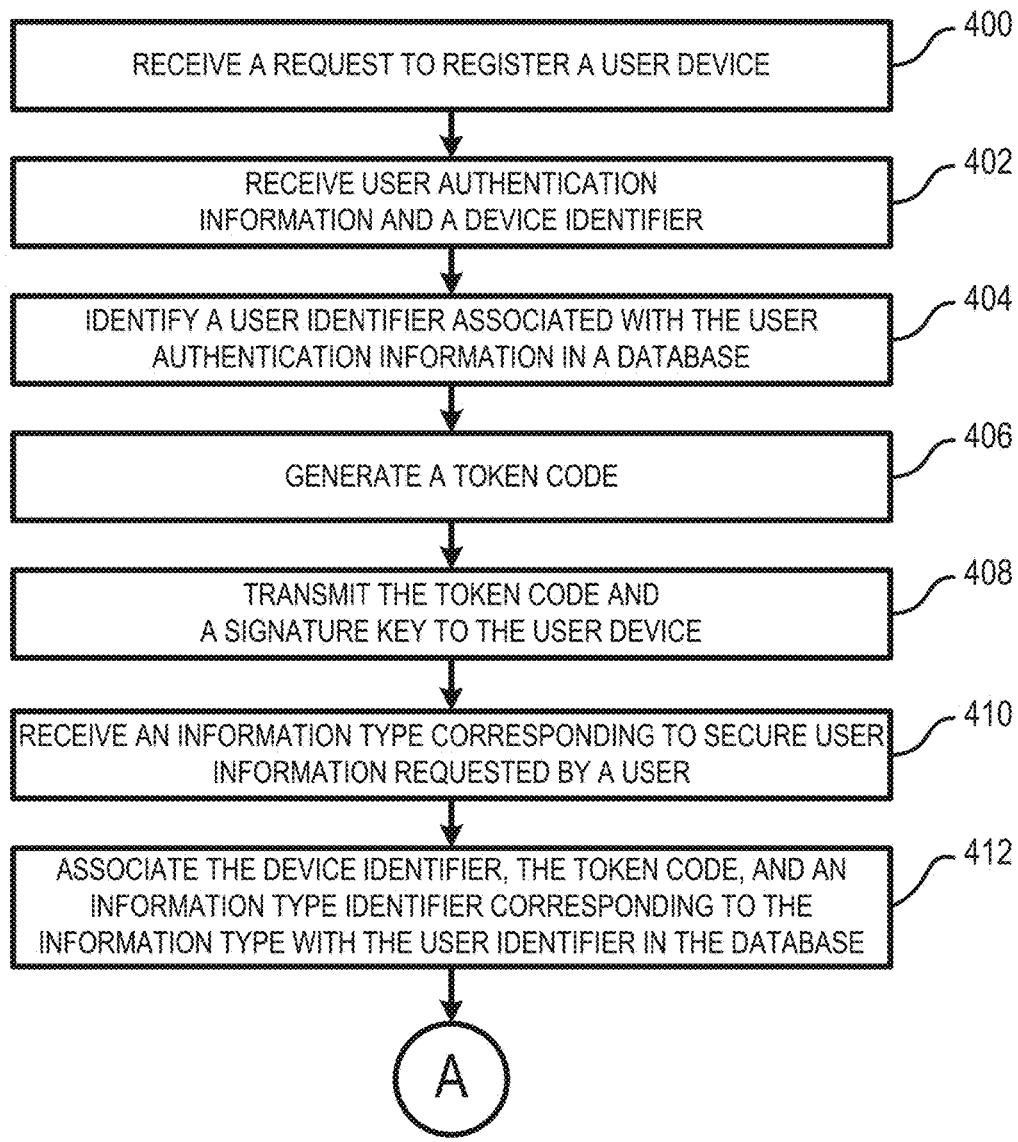
FIG. 4 is a flow chart of a process for registering a user device according to some aspects of the present disclosure.

FIG. 4 is a flow chart of a process for registering a user device with the authentication system 102 of FIG. 1 to allow the user device to receive secure information without authenticating the user of the user device according to some aspects of the present disclosure. The process is described with respect to FIGS. 1-3, unless otherwise indicated, though other implementations are possible without departing from the scope of the present disclosure.

In block 400, a request is received to register the user device 104. In some aspects, the request may be received by the processor 110 as a signal transmitted from the user device 104 corresponding to the request. For example, a signal may be generated in response to a user selecting a selection option on a user interface generated by the processor 110. The selection option may correspond to a request to register the user device.

Figure 5:
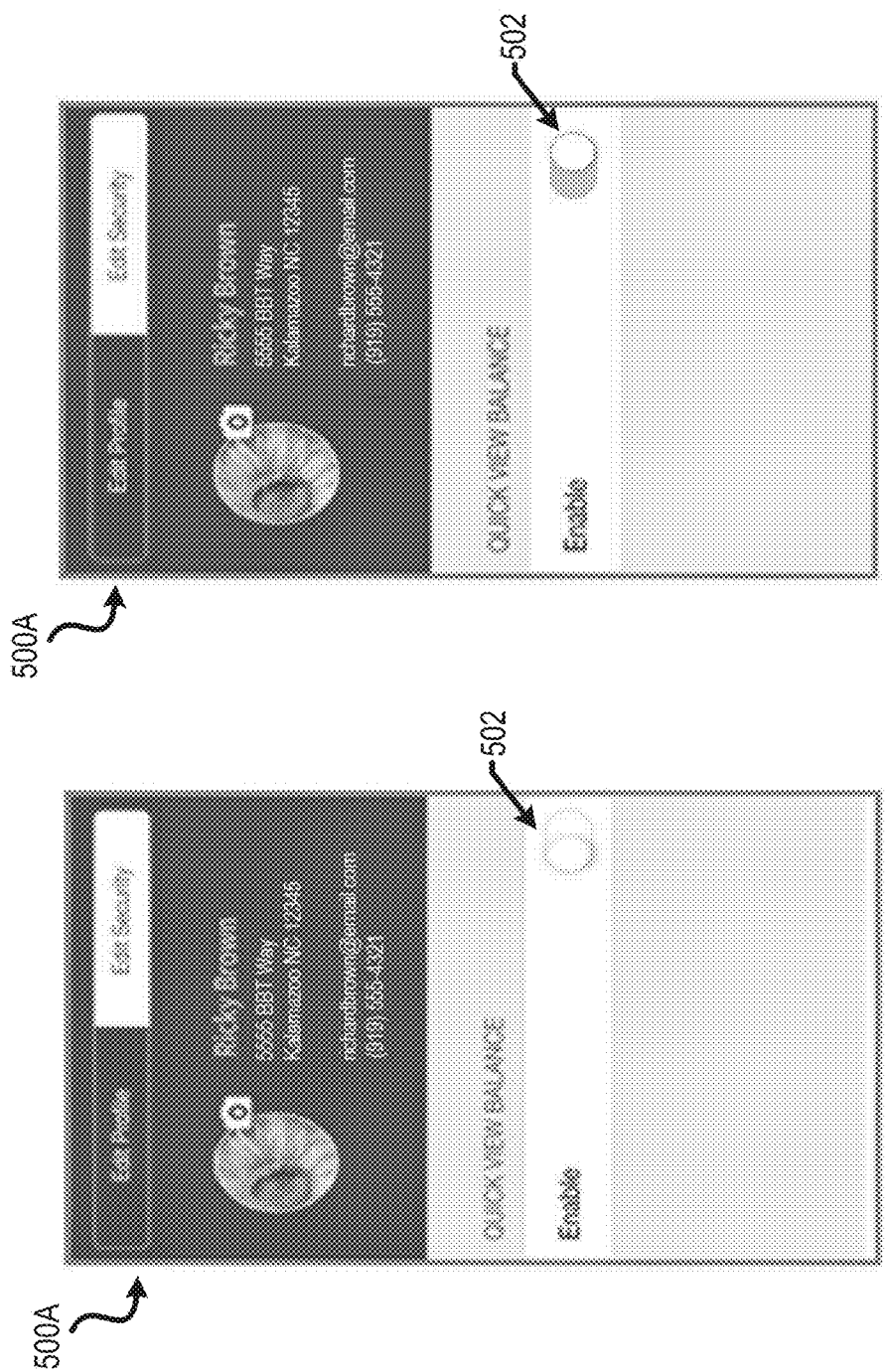
FIG. 5A is an example of a user interface displaying a selection option to enable registration of the user device according to some aspects of the present disclosure.
FIG. 5B is an example of a user interface displaying the selection option of FIG. 5A in an enabled position according to some aspects of the present disclosure.

FIGS. 5A and 5B are examples of user interfaces 500A, 500B displaying a selection option 502 to enable registration of a user device 104 according to some aspects of the present disclosure. In some aspects, the user interfaces 500A, 500B may be generated by the processor 110 in response to an instruction from the authentication engine 114. The processor 110 may generate the user interfaces 500A, 500B and transmit the user interfaces 500A, 500B to the user device 104 via the network 106. In FIG. 5A, the selection option 502 is in a disabled position. In FIG. 5B, the selection option 502 is toggled by the user of the user device 104 to an enabled position. In some aspects, toggling the selection option 502 to the enabled position may cause the user device 104 to generate and transmit a signal to the authentication system 102 corresponding to a request to register the user device 104 with the authentication system 102.

Returning to FIG. 4, in block 402, user authentication information and a device identifier are received. In some aspects, the authentication information may be received as a signal generated by the user device 104 corresponding to an input of alphanumeric characters into an input option generated by the processor 110 and displayed on a display unit of the user device 104. In some aspects, the authentication information may correspond to a username or other identifier and a password. In additional and alternative aspects, the authentication information may include other input or combinations of input unique to the user to authenticate that the request for registering the user device 104 with the authentication system corresponds to a user. In some aspects, the steps described in block 400 and block 402 may be performed simultaneously. For example, the user authentication information transmitted to the authentication system 102 may serve as a request to register the user device 104. The device identifier may correspond to a unique number, such as the serial number of the device that may be used to identify the user device 104. In some aspects, the device identifier may be transmitted automatically with the authentication information.

Figure 6:
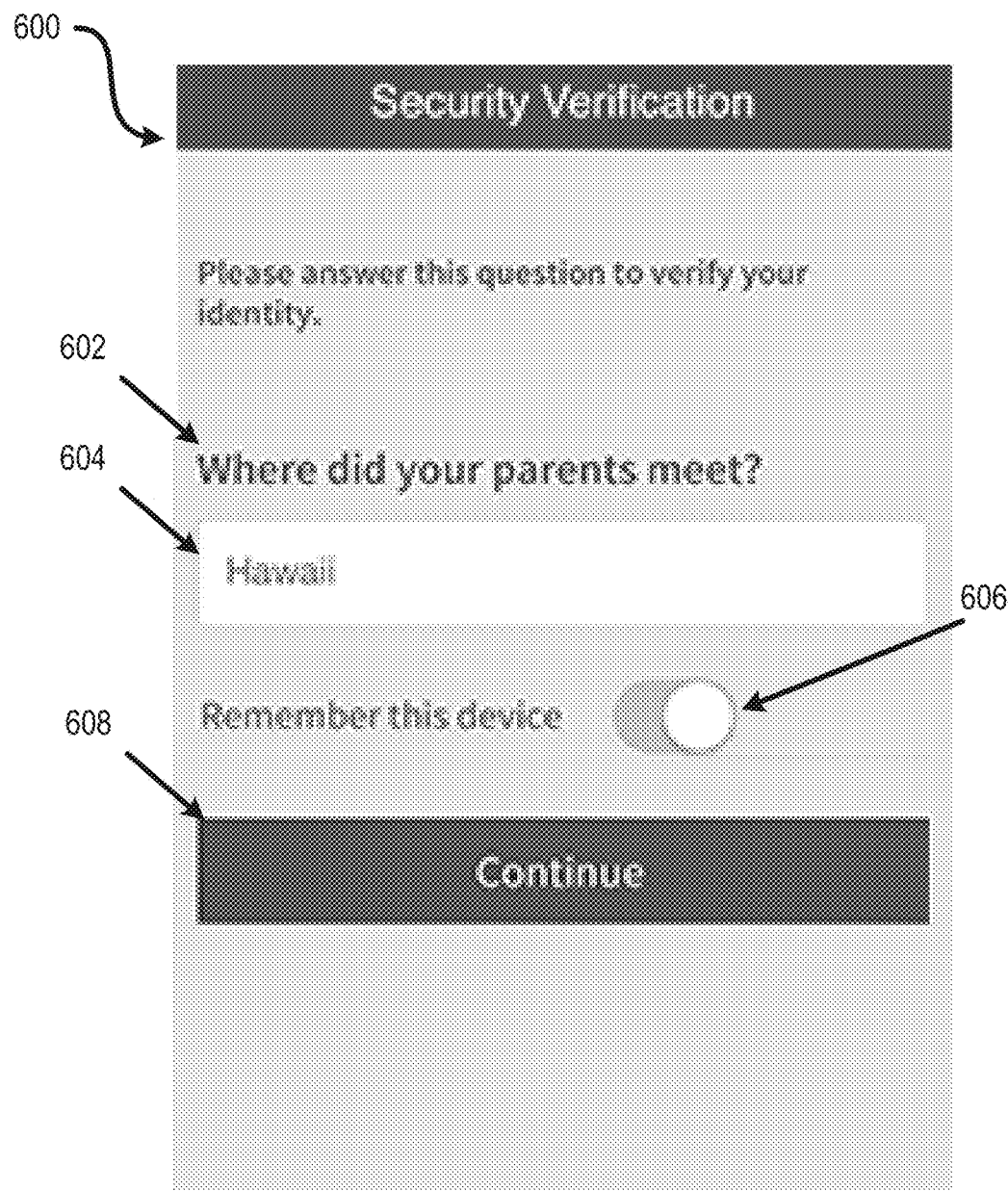
FIG. 6 is an example of a user interface displaying an input option for receiving user authentication information to register the user device according to some aspects of the present disclosure.

FIG. 6 is an example of a user interface 600 for receiving user authentication information to register the user device 104 according to some aspects of the present disclosure. In some aspects, the user interface 600 may be generated by the processor 110 in response to receiving a signal corresponding to a request to register the user device 104. The user interface 600 includes a security question 602 and includes an input option that may allow the user to enter an answer to the security question 602 using a keypad or keyboard of the user device 104. The security question 602 may include a question answered by the user prior to registering the user device 104. The answer to the security question may be stored in the secure-information database 130 or another database as authentication information 310 associated with a user identifier 132C corresponding to the user. The user interface 600 also includes a selection option 606 that may correspond to a request to remember the user device without having to reenter the authentication information. The user interface 600 also includes a selection option corresponding to a request to submit the answer to the security question 602 entered in the input option 604 to the authentication system 102.

Returning to FIG. 4, in block 404, a user identifier associated with the user authentication information in a database is identified. In response to receiving the user authentication information, the processor 110 may compare the user authentication information 310 stored in the secure-information database 130. Upon identifying the authentication information 310 matching the authentication information transmitted from the user device 104, the processor 110 may identify the user identifier 132C associated with the authentication information 310 in the database 130.

In block 406, a token code is generated. In some aspects, the token code generator 116 may cause the processor 110 to randomly generate a sequence of numbers to generate the token code 126. In at least one aspect, where the secure information relates to financial information, the token code may serve as a masked online banking ("OLB") number. The token code 126 may be generated subsequent to a successful authentication of the user using the authentication information 310. In an example where the secure information relates to financial information, the token code may serve as a masked online banking ("OLB") number.

In block 408, the token code and a signature key are transmitted to the user device 104. In some aspects, the token code and a copy of the signature key 118 may be transmitted to the user device 104 as a signal via the network 106. The token code and signature key 118 may be stored at a designated location, such as a datastore or database, in the user device 104.

In block 410, an information type corresponding to the secure user information requested by the user is received. The information type may be transmitted to the authentication system 102 in the form of a signal generated in response to a selection of a selection option or input on a user device 104. In some aspects, the authentication system 102 may allow more than one information type to be selected by the user. In one example, where the secure information relates to sensitive financial information, the information type may be the account balances for accounts held by the user. A user interface 600 may allow the user to select one or more available accounts to receive account balances via the user device 104. The information type may correspond to a signal generated in response to a selection of the selection options corresponding to the information types displayed on a user device 104. The processor 110 may convert the signal into a code or marker corresponding to the information type.

Figure 7:
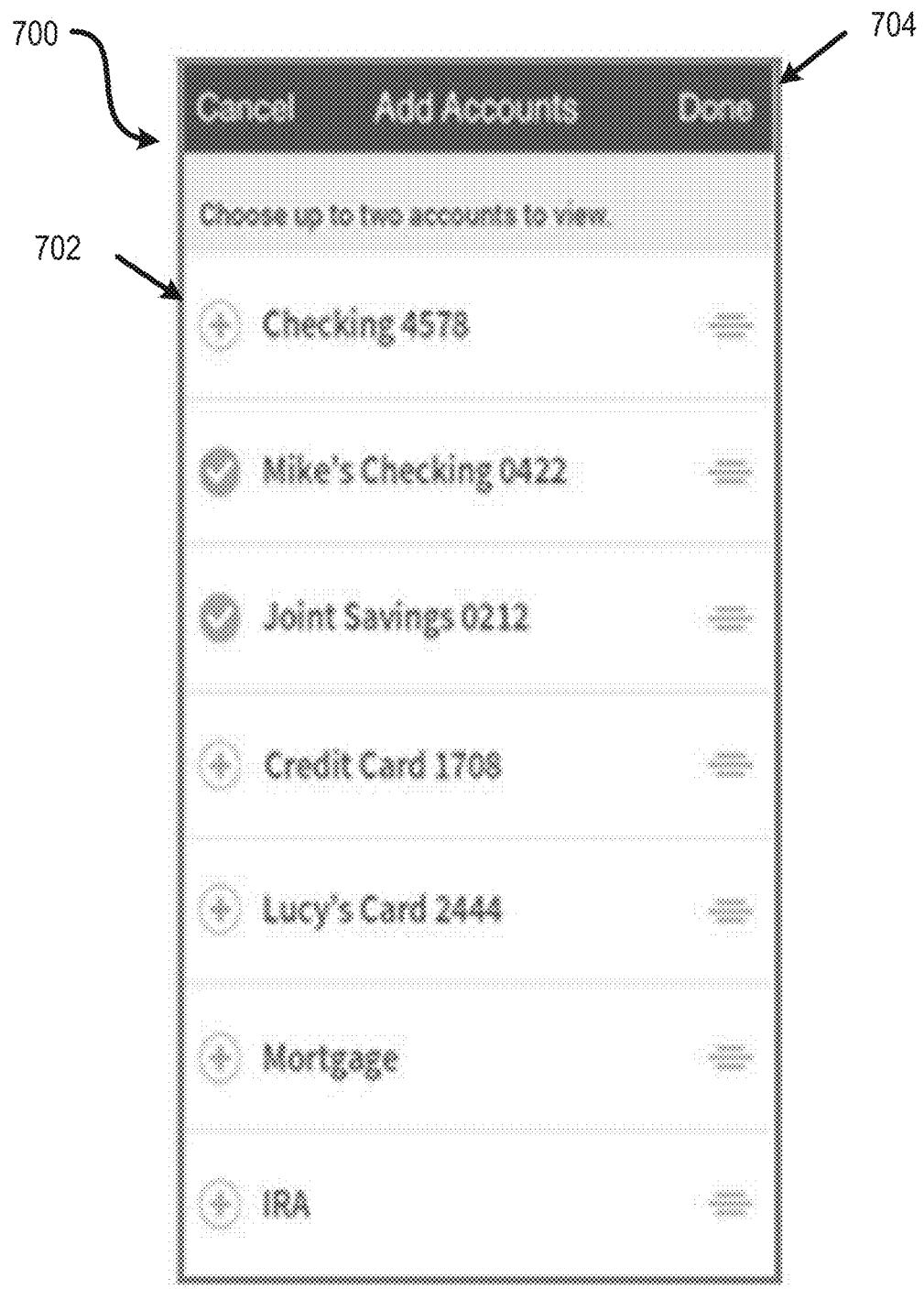
FIG. 7 is an example of a user interface displaying selection options corresponding to secure information types according to some aspects of the present disclosure.

FIG. 7 is an example of a user interface 700 displaying selection options 702 corresponding to secure information types according to some aspects of the present disclosure. In some aspects, the user interface 700 may be generated by the processor 110 in response to receiving the token code and the signature key as described in block 408. In other aspects, user interface 700 may be generated subsequent to transmitting the user authentication information 310 to the authentication system 102. In FIG. 7, the information types correspond to types of accounts held by the user. For example, the information types include two checking accounts, a joint savings account, a credit card, a debit card, a mortgage loan, and an IRA. Each of the information types includes a selection option 702 selectable by the user to select one or more information types for transmitting to the authentication system 102.

Returning to FIG. 4, in block 412, the device identifier 124, the token code 126 and the information type identifier 128 are associated with the user identifier in the device-identification database 120. In one example, the block 412, the device identifier 124, the token code 126 and the information type identifier 128 may be stored in a memory location of the device-identification database 120 as described in FIG. 2.

Authenticating a User Device

Figure 8:
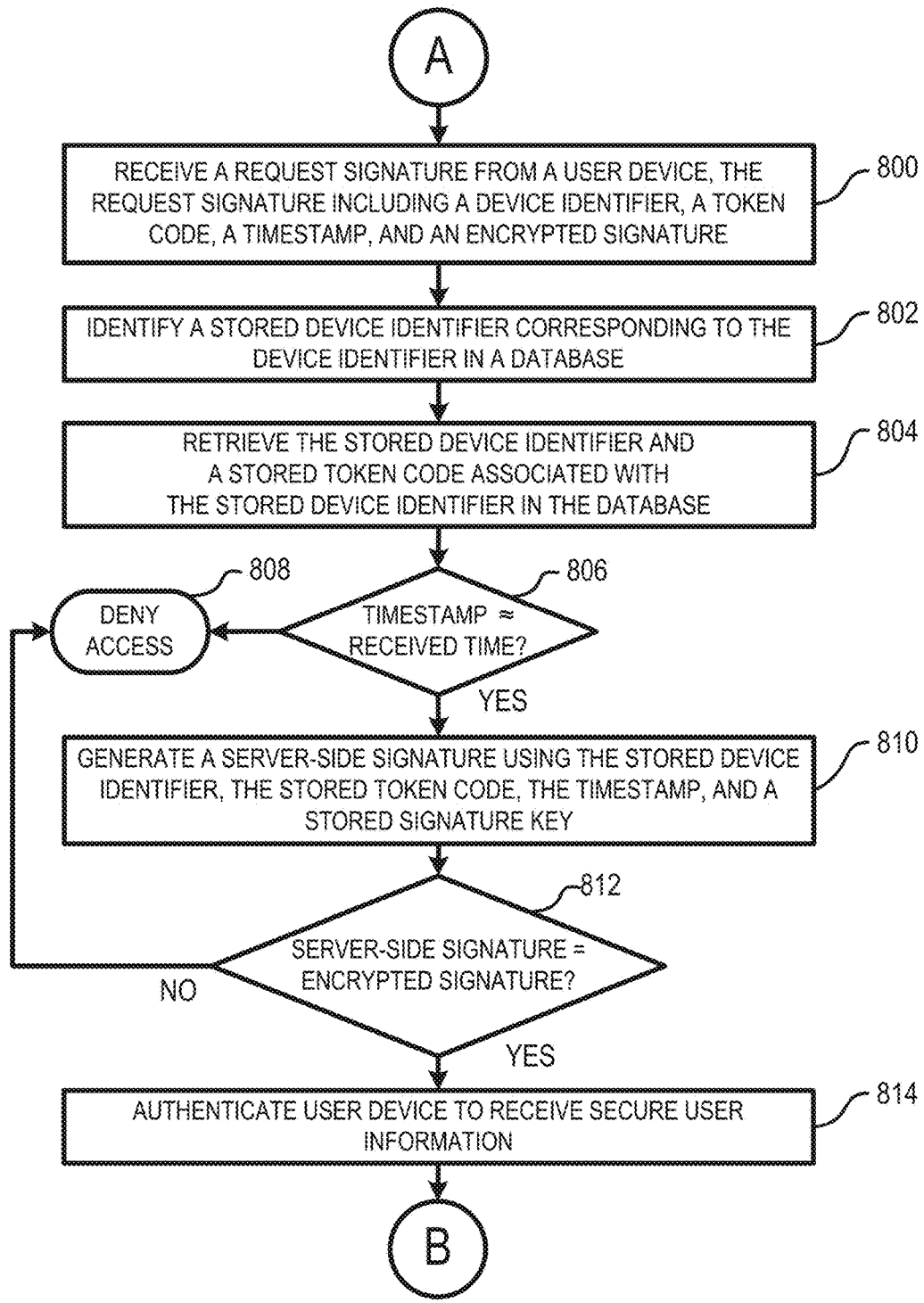
FIG. 8 is a flow chart of a process for authenticating a user device to access secure user information according to some aspects of the present disclosure.

FIG. 8 is a flow chart of a process for authenticating a user device to access secure user information according to some aspects of the present disclosure. The process is described with respect to FIGS. 1-3, unless otherwise indicated, though other implementations are possible without departing from the scope of the present disclosure.

In block 800, a request signature is received from the user device 104. The request signature may include a device identifier corresponding to the user device 104, a token code previously transmitted to the user device 104 as described in block 408 of FIG. 4, a timestamp corresponding to the time that the request signature was transmitted from the user device 104 to the authentication system 102, and an encrypted signature key. The encrypted signature may include a version of the user identifier, the token code, and the timestamp that are encrypted using the signature key transmitted to the user device 104 as described in block 408 of FIG. 4. The request signature may serve as a request from a program or device application on the user device 104 to transmit secure information to the user device 104. In one example, generating the encrypted signature may include calculating a keyed-hash message authentication code ("HMAC") using the token code, the device identifier, and the timestamp in combination with the signature key. The request signature may include the token code, the device identifier, the timestamp, and the calculated HMAC.

In block 802, a stored device identifier corresponding to the device identifier in the database 120 is identified. In some aspects, the stored device identifier may be identified by comparing the device identifier received from the user device with device identifiers stored in the database 120 (e.g., device identifiers 124). A matching algorithm or other matching means may be included in the authentication engine 114 and applied to determine a stored device identifier matching the device identifier included in the request signature.

In block 804, the stored device identifier and the stored token code associated with the stored device identifier in the database 120 may be retrieved. For example, subsequent to identifying the stored device identifier, the processor 110 may identify the associations between the stored device identifier and may retrieve the stored device identifier and the stored token code included in the associations as described in FIG. 2.

In block 806, the processor 110 determines if the timestamp corresponding to the transmission time of the request signature and the time that the request signature was received at the authentication system 102 are close enough together to continue the authentication process. In some aspects, the processor 110 may calculate a delay between the timestamp and the received time by subtracting the time corresponding to the timestamp from the time that the request signature was recorded as received. The delay may be compared to a threshold (e.g., 20 seconds, 30 seconds, 1 minute) to determine if the delay is within a threshold window of time. Access to the secure information may be denied to the user device 104 (block 808) in response the delay being outside of the threshold window.

In block 810, in response to determining that the delay is sufficiently short to continue the device authentication process, a server-side signature is generated using the stored device identifier, the stored token code, the timestamp, and the stored signature key 118. In some aspects, the processor 110 may generate a server-side signature as a recreation of all or a portion of the request signature by the user device 104. For example, the processor 110 may encrypt the stored token code, the stored device identifier, and the timestamp using the signature key 118 to serve as the server-side signature. The encryption of the server-side signature using the signature key may be performed using the encryption methods for generating an encrypted portion of the request signature received by the user device 104. For example, where the encrypted portion of the request signature was generated by calculating an HMAC using the signature key, the encrypted version may be generated by calculating a server-side HMAC using the signature key. For example, generating the encrypted version of the stored token code, the device identifier, and the request timestamp may include calculating a HMAC using the stored token code, the stored device identifier, and the request timestamp in combination with the signature key. The server-side signature may include the stored token code, the stored device identifier, the request timestamp, and the calculated server-side HMAC.

In block 812, the processor 110 may compare the server-side signature and the encrypted signature to determine whether they match. In some aspects, an identical match may be required to continue the authentication process. In other aspects, a substantial match may be allowed to compensate for small errors in the encryption or decryption software. The processor 110 may apply a matching algorithm to determine whether the server-side signature matches the encrypted signature. For example, the authentication engine 114 may include instructions for the processor 110 to match one or more characters located in the server-side signature and the encrypted signature included in the request signature. Access to the secure information may be denied, as described in block 808, when the server-side signature and an encrypted signature of the request signature do not match. The user device 104 may be authenticated to receive the secure user information in response to determining that the server-side signature and the encrypted signature of the request signature.

Although the flow chart of FIG. 8 describes determining whether the server-side signature and an encrypted signature match, the comparison between the request signature and the recreated signature may be implemented in other ways without departing from the scope of the present disclosure.

For example, the server-side signature may be generated by the processor 110 to include the stored device identifier, the stored token code, the timestamp, and an encrypted server-side signature including an encrypted version of the stored device identifier, the stored code, and the timestamp encrypted using a stored signature key 118. In this example, the server-side signature may be compared to the entire request signature including both encrypted and non-encrypted portions (e.g., the device identifier, the token code, the timestamp and the encrypted version of the device identifier, the token code, the timestamp) to determine a match.

In another example, the server-side signature may be generated to include the stored device identifier, the stored token code, and the timestamp. The processor 110 may first decrypt the encrypted portion of the request signature and compare the server-side signature with the decrypted portion of the request signature.

Transmitting Secure Information to a Registered User Device

Figure 9:
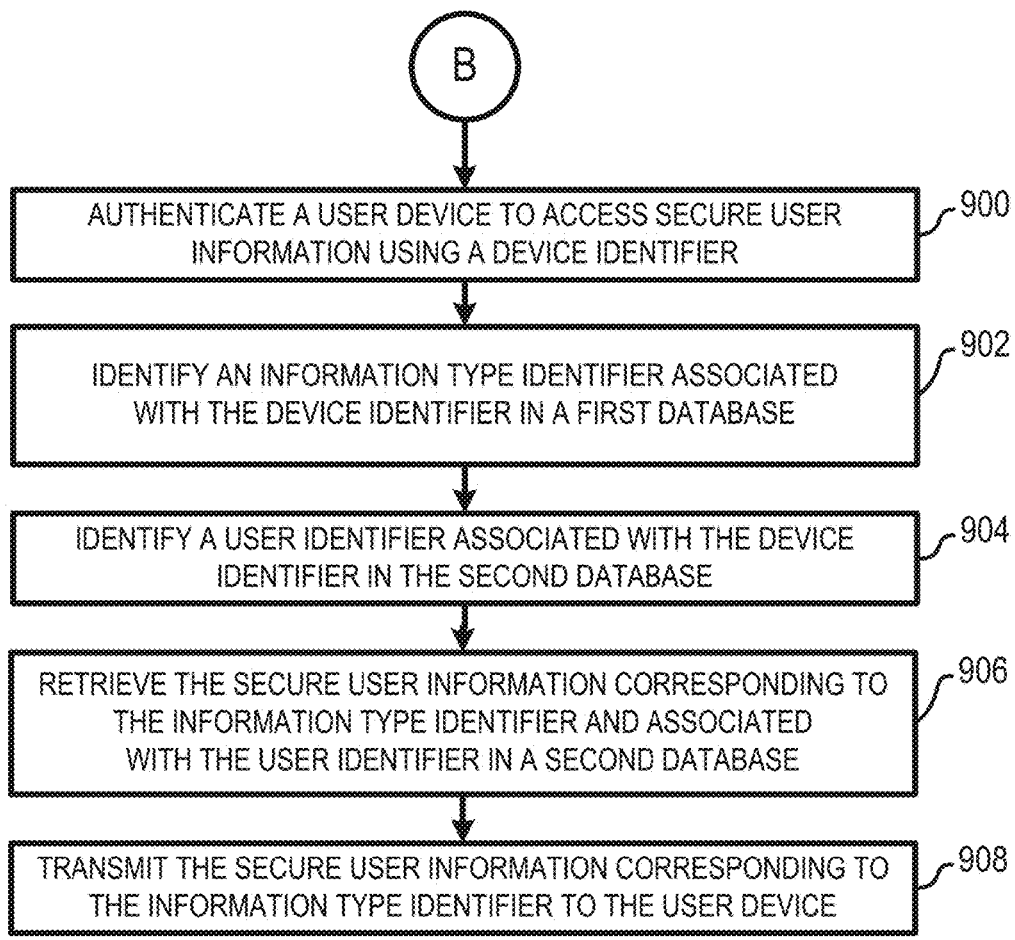
FIG. 9 is a flow chart of a process for transmitting secure user information to an authenticated user device according to some aspects of the present disclosure.

FIG. 9 is a flow chart of a process for transmitting secure user information to an authenticated user device according to some aspects of the present disclosure. The process is described with respect to FIGS. 1-3, unless otherwise indicated, though other implementations are possible without departing from the scope of the present disclosure.

In block 900, the user device 104 s authenticated to access secure user information suing a device identifier. In some aspects, the user device 104 may be authenticated by registering the user device 104 with the authentication system 102 and using the authentication process described in FIG. 8. For example, the authentication system 102 may authenticate the user device 104 using a request signature including a device identifier, a token code, a timestamp, and an encrypted version of the device identifier, the token code, and the timestamp.

In block 902, an information type identifier associated with the device identifier in the device-identification database 120 is identified. In some aspects, the processor 110 may identify the device identifier from the request signature used to authenticate the user device 104. The processor 110 may search the device-identification database 120 for the device identifier and identify an information type identifier associated with the device identifier in the database 120.

In block 904, a user identifier associated with the device identifier in the device-identification database 120 is identified. In some aspects, the processor 110 may search the device-identification database 120 for the device identifier and identify a user identifier associated with the device identifier in the database 120. In some aspects, the user identifier may be identified in the same search of the database 120 as the search for the information type identifier described in block 902.

In block 906, the secure user information corresponding to the information type identifier and associated with the user identifier in the secure-information database 130 is retrieved. In some aspects, the processor 110 may retrieve the secure information corresponding to the information type identifier by identifying a memory location in which secure information of an information type corresponding to the information type identifier is stored. For example, the information type identifier may correspond to type-A secure information. The processor 110 may search the memory locations to identify the memory location 300 including the type-A information 306. The processor 110 may compare the user identifier with the user identifiers 132A included in the memory location 300 and associated with the type-A information 306 to determine the type-A information corresponding to the user identifier. In some aspects, the processor 110 may compare the user identifier and the user identifiers 132A by applying a matching algorithm or other means for comparing multiple identifiers. Upon identifying the user identifier 132A matching the user identifier identified in block 904, the processor 110 may retrieve the type-A information 306 associated with the user identifier 132A in the memory location 300 of the database 130.

In block 908, the processor 110 may retrieve the type-A information 306 associated with the user identifier 132A in the memory location 300 of the database 130. In block 908, the processor 110 may transmit the secure user information to the user device 104 via the network. The user device 104 may display the secure user information corresponding to the information type identifier without requiring the user to be authenticated to view the secure information.

Figure 10:
FIG. 10 is an example of a user interface displaying secure user information according to some aspects of the present disclosure.

FIG. 10 is an example of a user interface 1000 displaying secure user information according to some aspects of the present disclosure. In some aspects, the user interface 1000 may be displayed on the user device 104 with without requiring user authentication. In some aspects, the secure information may be displayed on an interface of the user device 104 using a program or application running on the user device 104. The secure information includes secure information 1002 relating to an available account balances for an account labeled "Mike's Checking 0422" and secure information 1004 relating to an available account balance for an account labeled "Joint Savings 0212." The secure information 1002, 1004 may correspond to two different types of information and may corresponding information type identifiers stored in the device-identification database 120 and associated with a device identifier corresponding to the user device 104.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A device authentication system, comprising:
a processor communicatively couplable to a user device via a network; and
a memory accessible to the processor and including instructions that are executable by the processor for causing the processor to:
transmit a signature key to the user device to enable the user device to generate an encrypted signature by encrypting information using the signature key;
subsequent to transmitting the signature key to the user device, receive a request signature from the user device via the network at a receipt time, the request signature corresponding to a request from a user of the user device to access secure user information, wherein the request signature includes:
a device identifier corresponding to the user device,
a token code previously transmitted to the user device by the processor,
a timestamp for a transmission time at which the request signature was transmitted from the user device to the processor, and
an encrypted signature including a version of the device identifier, the token code, and the timestamp encrypted by the user device using the signature key previously transmitted to the user device by the processor; and
subsequent to receiving the request signature:
identify a stored device identifier corresponding to the device identifier in a database by comparing the device identifier received from the user device with a plurality of device identifiers stored in the database to determine a matching device identifier corresponding to the stored device identifier;
retrieve the stored device identifier and a stored token code from the database, the stored token code being associated with the stored device identifier in the database;
calculate a one-way delay between (i) the transmission time at which the request signature was transmitted by the user device and (ii) the receipt time at which the request signature was received by the processor;
determine that the one-way delay is within a threshold window of time; and
in response to determining that the one-way delay is within the threshold window of time:
generate a server-side signature that includes a version of the stored device identifier, the stored token code, and the timestamp encrypted using a stored signature key that is associated with the signature key previously transmitted to the user device;

compare the server-side signature to the encrypted signature to determine a signature match; and
in response to determining the signature match, authenticate the user device to access the secure user information.

2. The device authentication system of claim 1, further comprising a second database accessible to the processor and including one or more memory locations in which the secure user information is stored,
wherein at least a portion of the secure user information is associated with a user identifier corresponding to the user of the user device,
wherein the memory includes additional instructions that are executable by the processor for causing the processor to retrieve at least a portion of the secure user information from the second database and transmit the at least a portion of the secure user information to the user device via the network.

3. The device authentication system of claim 1, wherein the memory includes additional instructions that are executable by the processor for causing the processor to:
identify a user identifier and an information type identifier associated with the device identifier in the database, the user identifier corresponding to the user of the user device, the information type identifier corresponding to a first subset of the secure user information requested by the user for display on the user device;
compare the user identifier to a plurality of user identifiers stored in a first memory location to identify a matching user identifier stored in the first memory location;
retrieve the first subset of the secure user information corresponding to the information type identifier and associated with the matching user identifier in the first memory location; and
transmit the first subset of the secure user information to the user device via the network.

4. The device authentication system of claim 3, wherein the memory includes additional instructions that are executable by the processor for causing the processor to:
identify a second information type identifier associated with the device identifier in the database, the second information type identifier corresponding to a second subset of the secure user information requested by the user for display on the user device;
compare the user identifier to a second plurality of user identifiers stored in a second memory location to identify a second matching user identifier stored in the second memory location;
retrieve the second subset of the secure user information corresponding to the second information type identifier and associated with the second matching user identifier in the second memory location; and
transmitting the second subset of the secure user information to the user device via the network for displaying by the user device simultaneously with the first subset of the secure user information.

5. The device authentication system of claim 1, wherein the memory includes additional instructions that are executable by the processor for causing the processor to generate the server-side signature by calculating a keyed-hash message authentication code ("HMAC") using the stored device identifier, the stored token code, and the timestamp in combination with the stored signature key.

6. The device authentication system of claim 1, wherein the memory includes additional instructions that are executable by the processor for causing the processor to:

receive a first request to register the user device to access the secure user information;
receive user authentication information and the device identifier, the user authentication information corresponding to a set of characters inputted by the user via the user device;
authenticate the user using the user authentication information by comparing the user authentication information to stored authentication information stored in a memory location;
identify a user identifier associated with the stored authentication information in the memory location;
generate the token code;
transmit the token code and the signature key to the user device via the network;
receive an information type identifier corresponding to a subset of the secure user information requested by the user for display on the user device; and
associate the device identifier, the token code, and the information type identifier with the user identifier in the database.

7. The device authentication system of claim 1, wherein the secure user information corresponds to an account balance of a financial account held by the user.

8. A method, comprising:
transmitting, by an authentication system, a signature key to a user device to enable the user device to generate an encrypted signature by encrypting information using the signature key;
receiving, by the authentication system, a request signature from a user device via a network at a receipt time, the request signature corresponding to a request from a user of the user device to access secure user information, wherein the request signature includes:
a device identifier corresponding to the user device,
a token code previously transmitted to the user device by the authentication system,
a timestamp for a transmission time at which the request signature was transmitted from the user device to the authentication system, and
an encrypted signature including a version of the device identifier, the token code, and the timestamp encrypted by the user device using the signature key previously transmitted to the user device by the authentication system; and
subsequent to receiving the request signature:
identifying, by the authentication system, a stored device identifier corresponding to the device identifier in a database by comparing the device identifier received from the user device with a plurality of device identifiers stored in the database to determine a matching device identifier corresponding to the stored device identifier;
retrieving, by the authentication system, the stored device identifier and a stored token code from the database, the stored token code being associated with the stored device identifier in the database;
calculating, by the authentication system, a one-way delay between (i) the transmission time at which the request signature was transmitted by the user device and (ii) the receipt time at which the request signature was received by the authentication system;
determining, by the authentication system, that the one-way delay is within a threshold window of time; and
in response to determining that the one-way delay is within the threshold window of time:

generating, by the authentication system, a server-side signature using the stored device identifier, the stored token code, and the timestamp;
comparing, by the authentication system, the server-side signature to the request signature to determine a signature match;
in response to determining the signature match, authenticating, by the authentication system, the user device to access the secure user information.

9. The method of claim 8, wherein generating the server-side signature includes encrypting the stored device identifier, the stored token code, and the timestamp using a stored signature key, the stored signature key matching the signature key previously transmitted to the user device, wherein comparing the server-side signature to the request signature includes comparing the server-side signature to the encrypted signature.

10. The method of claim 8, wherein the server-side signature includes the stored device identifier, the stored token code, the timestamp and an encrypted server-side signature including an encrypted version of the stored device identifier, the stored token code, and the timestamp encrypted using a stored signature key.

11. The method of claim 8, wherein the server-side signature includes the stored device identifier, the stored token code, and the timestamp,
wherein comparing the server-side signature to the request signature includes:
decrypting the encrypted signature to generate a decrypted version of the device identifier, the token code, and the timestamp; and
comparing the server-side signature to the decrypted version of the device identifier, the token code, and the timestamp.

12. The method of claim 8, further comprising:
identifying a user identifier and a first information type identifier associated with the device identifier in the database, the user identifier corresponding to the user of the user device, the first information type identifier corresponding to a first subset of the secure user information requested by the user for display on the user device;
comparing the user identifier to a first plurality of user identifiers to identify a matching user identifier;
retrieving the first subset of the secure user information corresponding to the first information type identifier and associated with the matching user identifier; and
transmitting the first subset of the secure user information to the user device via the network.

13. The method of claim 12, further comprising
identify a second information type identifier associated with the device identifier in the database, the second information type identifier corresponding to a second subset of the secure user information requested by the user for display on the user device;
compare the user identifier to a second plurality of user identifiers to identify a second matching user identifier;
retrieve the second subset of the secure user information corresponding to the second information type identifier and associated with the second matching user identifier; and
transmitting the second subset of the secure user information to the user device via the network for displaying by the user device simultaneously with the first subset of the secure user information.

14. The method of claim 8, wherein generating the server-side signature includes calculating a keyed-hash message authentication code ("HMAC") using the stored device identifier, the stored token code, and the timestamp in combination with a stored signature key.

15. The method of claim 8, further comprising:
receiving a first request to register the user device to access the secure user information;
receiving user authentication information and the device identifier, the user authentication information corresponding to a set of characters inputted by the user via the user device;
authenticating the user using the user authentication information by comparing the user authentication information to stored authentication information stored in a memory location;
identifying a user identifier associated with the stored authentication information in the memory location;
generating the token code;
transmitting the token code and the signature key to the user device via the network;
receiving an information type identifier corresponding to a subset of the secure user information requested by the user for display on the user device; and
associating the device identifier, the token code, and the information type identifier with the user identifier in the database.

16. A non-transitory computer-readable medium comprising program code that is executable by a processor of an authentication system to cause the processor to:
transmit a signature key to a user device to enable the user device to generate an encrypted signature by encrypting information using the signature key;
receive a request signature from a user device via a network at a receipt time, the request signature corresponding to a request from a user of the user device to access secure user information, wherein the request signature includes:
a device identifier corresponding to the user device,
a token code previously transmitted to the user device by the processor,
a timestamp for a transmission time at which the request signature was transmitted from the user device to the processor, and
an encrypted signature including a version of the device identifier, the token code, and the timestamp encrypted by the user device using the signature key previously transmitted to the user device by the processor;
subsequent to receiving the request signature:
identify a stored device identifier corresponding to the device identifier in a database by comparing the device identifier received from the user device with a plurality of device identifiers stored in the database to determine a matching device identifier corresponding to the stored device identifier; and
retrieve the stored device identifier and a stored token code from the database, the stored token code being associated with the stored device identifier in the database;
calculate a one-way delay between (i) the transmission time at which the request signature was transmitted by the user device and the receipt time at which the request signature was received by the authentication system;
determine that the one-way delay is within a threshold window of time; and
in response to determining that the one-way delay is within the threshold window of time:

generate a server-side signature includes the stored device identifier, the stored token code, and the timestamp encrypted using a stored signature key associated with the signature key previously transmitted to the user device;

compare the server-side signature to the encrypted signature to determine a signature match; and in response to determining the signature match, authenticate the user device to access the secure user information.

17. The non-transitory computer-readable medium of claim 16, wherein the program code is executable to cause the processor to:

identify a user identifier and an information type identifier associated with the device identifier in the database, the user identifier corresponding to the user of the user device, the information type identifier corresponding to a first subset of the secure user information requested by the user for display on the user device;

compare the user identifier to a plurality of user identifiers stored in a first memory location to identify a matching user identifier stored in the first memory location;

retrieve the first subset of the secure user information corresponding to the information type identifier and associated with the matching user identifier in the first memory location; and transmit the first subset of the secure user information to the user device via the network.

18. The non-transitory computer-readable medium of claim 17, wherein the program code is executable to cause the processor to:

identify a second information type identifier associated with the device identifier in the database, the second information type identifier corresponding to a second subset of the secure user information requested by the user for display on the user device;

compare the user identifier to a second plurality of user identifiers stored in a second memory location to identify a second matching user identifier stored in the second memory location;

retrieve the second subset of the secure user information corresponding to the second information type identifier and associated with the second matching user identifier in the second memory location; and transmitting the second subset of the secure user information to the user device via the network for displaying by the user device simultaneously with the first subset of the secure user information, wherein the first memory location includes a first plurality of information associated with the plurality of user identifiers and corresponding to a first type of information, wherein the second memory location includes a second plurality of information associated with the second plurality of user identifiers and corresponding to a second type of information, wherein the first type of information and the second type of information are different types of information.

19. The non-transitory computer-readable medium of claim 16, wherein the program code is executable to cause the processor to:

generate the server-side signature by calculating a keyed-hash message authentication code ("HMAC") using the stored device identifier, the stored token code, and the timestamp in combination with the stored signature key.

20. The non-transitory computer-readable medium of claim 16, wherein the program code is executable to cause the processor to:

receive a first request to register the user device to access the secure user information;

receive user authentication information and the device identifier, the user authentication information corresponding to a set of characters inputted by the user via the user device;

authenticate the user using the user authentication information by comparing the user authentication information to stored authentication information stored in a memory location;

identify a user identifier associated with the stored authentication information in the memory location;

generate the token code;

transmit the token code and the signature key to the user device via the network;

receive an information type identifier corresponding to a subset of the secure user information requested by the user for display on the user device; and associate the device identifier, the token code, and the information type identifier with the user identifier in the database.

* * * * *